United States Patent

[11] 3,613,797

| [72] | Inventors | Carroll J. Whitfield;<br>Jack C. Whitesides, both of Columbus, Ga. |
|---|---|---|
| [21] | Appl. No. | 29,137 |
| [22] | Filed | Apr. 16, 1970 |
| [45] | Patented | Oct. 19, 1971 |
| [73] | Assignee | Kelley Manufacturing Company<br>Columbus, Ga. |

[54] PEANUT DIGGER, SHAKER AND INVERTER
12 Claims, 6 Drawing Figs.

[52] U.S. Cl. .................................................. 171/61
[51] Int. Cl. ........................................... A01d 29/00
[50] Field of Search ................................. 171/21, 61, 28, 101

[56] References Cited
UNITED STATES PATENTS

| 2,585,416 | 2/1952 | Weid et al. | 171/21 |
| 3,024,849 | 3/1962 | Gregory | 171/61 |
| 3,181,617 | 5/1965 | Wallace | 171/61 |
| 3,241,619 | 3/1966 | Morrow | 171/61 |

*Primary Examiner*—Antonio F. Guida
*Attorney*—Jones & Thomas

ABSTRACT: A peanut digger-shaker-inverter apparatus for use in harvesting peanuts wherein two crop rows of peanut-laden plants are simultaneously removed from the ground, elevated above the ground as the apparatus proceeds down the crop rows, shaken to remove the dirt from the plants, and deposited back on the ground in a single row with foliage adjacent the ground and the roots and peanuts above the ground so as to be exposed to sun and air for drying. The inverter receives the plants generally in an upright attitude and in spaced-apart paths from the shaker and continues the movement of the plants in the spaced-apart paths away from the shaker and rolls or twists the plants along their direction of movement so as to move the foliage of the plants down between the paths so that the plants are deposited upon the ground in inverted positions.

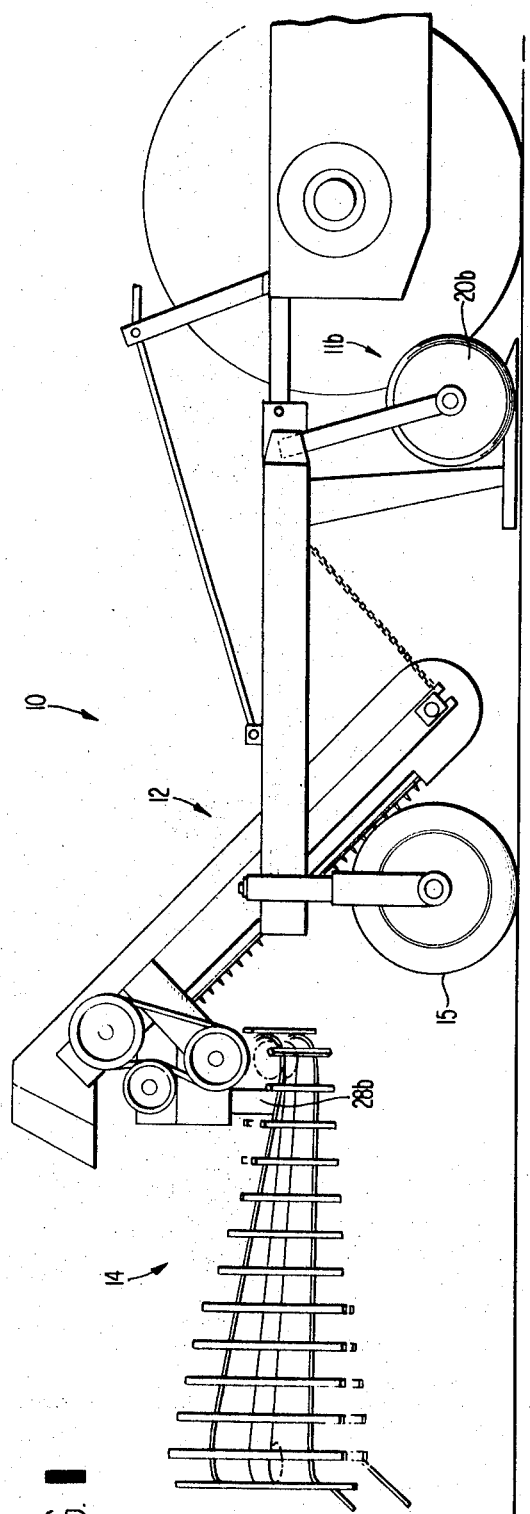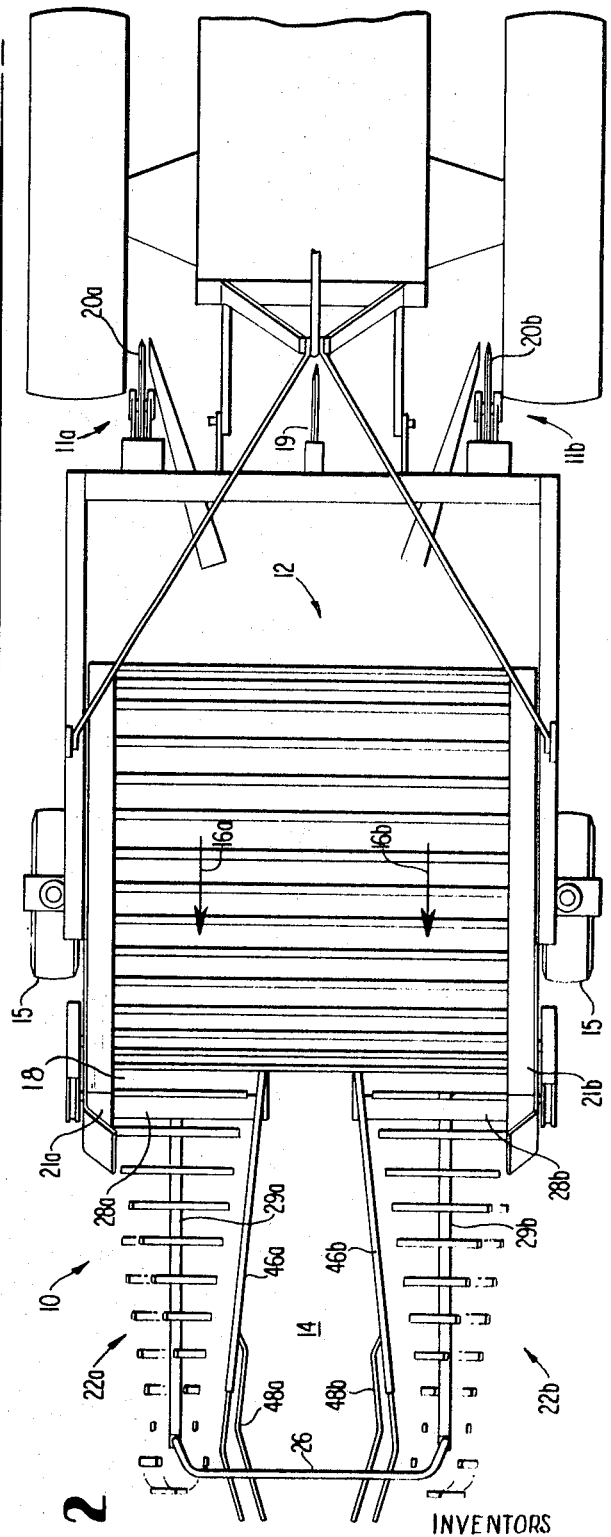
FIG. 1
FIG. 2
INVENTORS
CARROLL J. WHITFIELD
JACK C. WHITESIDES
BY Jones & Thomas
ATTORNEYS

PATENTED OCT 19 1971

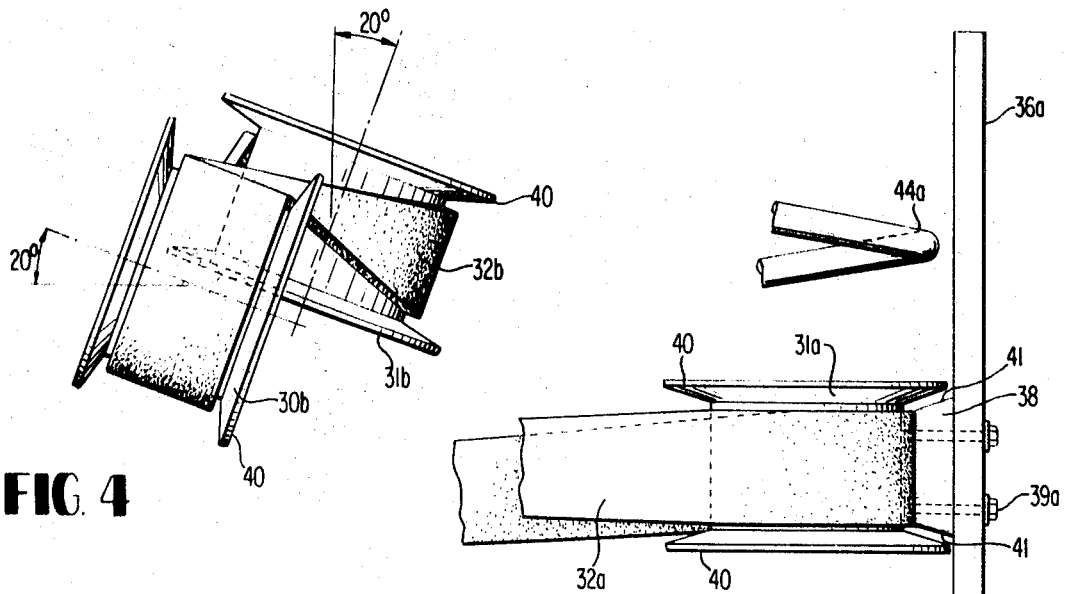
FIG. 4
FIG. 5
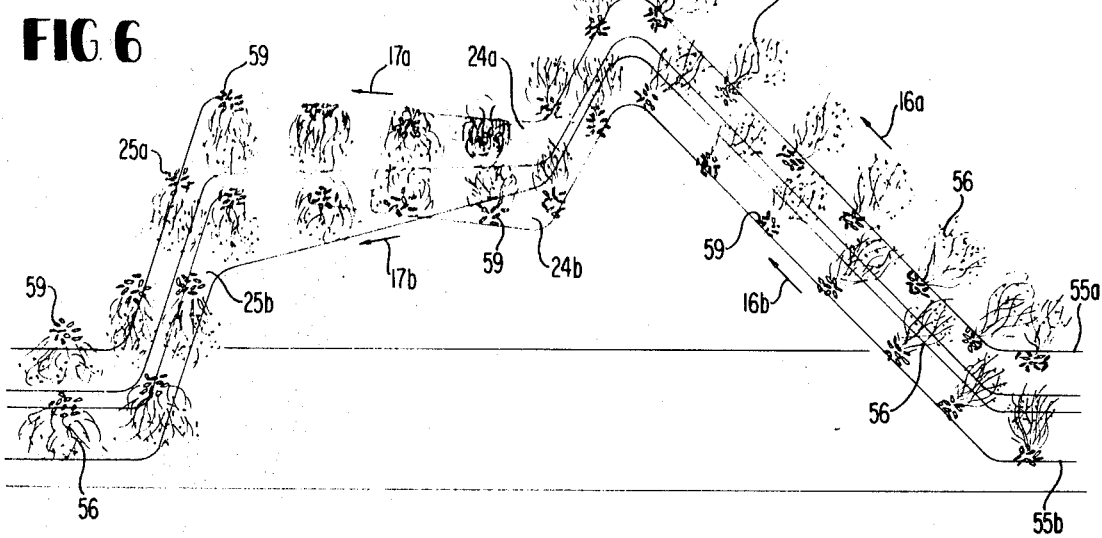
FIG. 6

PEANUT DIGGER, SHAKER AND INVERTER

BACKGROUND OF THE INVENTION

When harvesting peanuts, the mature peanut-laden plants have normally been plowed from the ground, the dirt shaken from the plants, and the plants stacked in windrows for sunning and exposure to atmospheric air for the purpose of drying the roots and peanuts of the plants. The machinery utilized to perform these basic functions usually comprise a plow assembly pulled through the earth by a tractor, a shaker conveyor, commonly referred to as a rattler, which is connected behind the plow assembly and functions to lift the plants from the ground and simultaneously elevate and shake the plants to remove the dirt from the roots and peanuts. When the plants leave the shaker frame, they are allowed to fall back to the earth where they are allowed to dry. When unearthing the plants with the plow assembly, it is convenient and has become common practice to plow adjacent crop rows of plants simultaneously and shake the plants generally in spaced-apart paths on the shaker, and then drop the plants in a single row for convenience in subsequently handling the plants. When the plants are allowed to fall from the shaker it is desirable that they fall to the ground foilage first; that is, so that the roots of the plants, including the nuts are on the top of the plant so that the sun and air can function to dry the nuts. If the plants are deposited on the ground in this manner they will dry quickly without having to be turned or removed to a drying area by other machines or by hand. After the nuts have been dried, the plants can be gathered from the ground for picking the nuts from the vines.

SUMMARY OF THE INVENTION

Briefly described, the invention comprises a digger-shaker-inverter apparatus which functions to remove peanut-laden plants from adjacent crop rows in the field, shake the dirt from the plants, and deposit the plants from adjacent rows into a single row of inverted plants, with the nuts and roots exposed. The apparatus includes a pair of plow assemblies spaced apart a distance corresponding to the spacing of adjacent crop rows of plants for unearthing the plants, a shaker for lifting and passing the plants in spaced generally parallel paths in an upwardly inclined direction while shaking the dirt from the roots of the plants, and an inverter connected to the rear of the shaker for receiving the plants in their paths and in upright attitudes from the shaker and moving the plants in two paths away from the shaker while rolling or twisting the plants along their direction of movement so that the foliage is rotated from above the plants down between the paths of the plants as the plants are passed by the inverter from the conveyor to the ground.

Thus, it is an object of this invention to provide a digger-shaker-inverter apparatus for unearthing peanut plants, removing the dirt from the roots and peanuts of the plants, and depositing the plants on the ground in an inverted position.

Another object of this invention is to provide an inverter mechanism in combination with a shaker, wherein the inverter mechanism functions to receive peanut plants from the shaker generally in separate paths and deposit the plants on the ground in a single row in an inverted attitude.

Another object of this invention is to provide apparatus for inverting peanut plants which is connectable to a shaker and which moves the plants in spaced paths away from the shaker, rolls the plants toward each other and drops the plants onto the ground in a substantially single row of plants, and in an inverted attitude.

Another object of this invention is to provide a method and apparatus for economically and expediently harvesting peanuts.

Other objects, features and advantages of the present invention will become apparent upon reading the following specification, when taken into conjunction with the accompanying drawing.

BRIEF DESCRIPTION OF THE DRAWING

FIG. 1 is a side elevational view of the digger-shaker-inverter.

FIG. 2 is a top view of the digger-shaker-inverter.

FIG. 4 is a detailed showing of one of the belts of the inverter.

FIG. 5 is a detailed showing of one of the conveyor assemblies of the inverter.

FIG. 6 is a schematic illustration of the paths of travel of the peanut plants as they are processed by the digger-shaker-inverter.

DESCRIPTION OF THE PREFERRED EMBODIMENT

Figure 3:
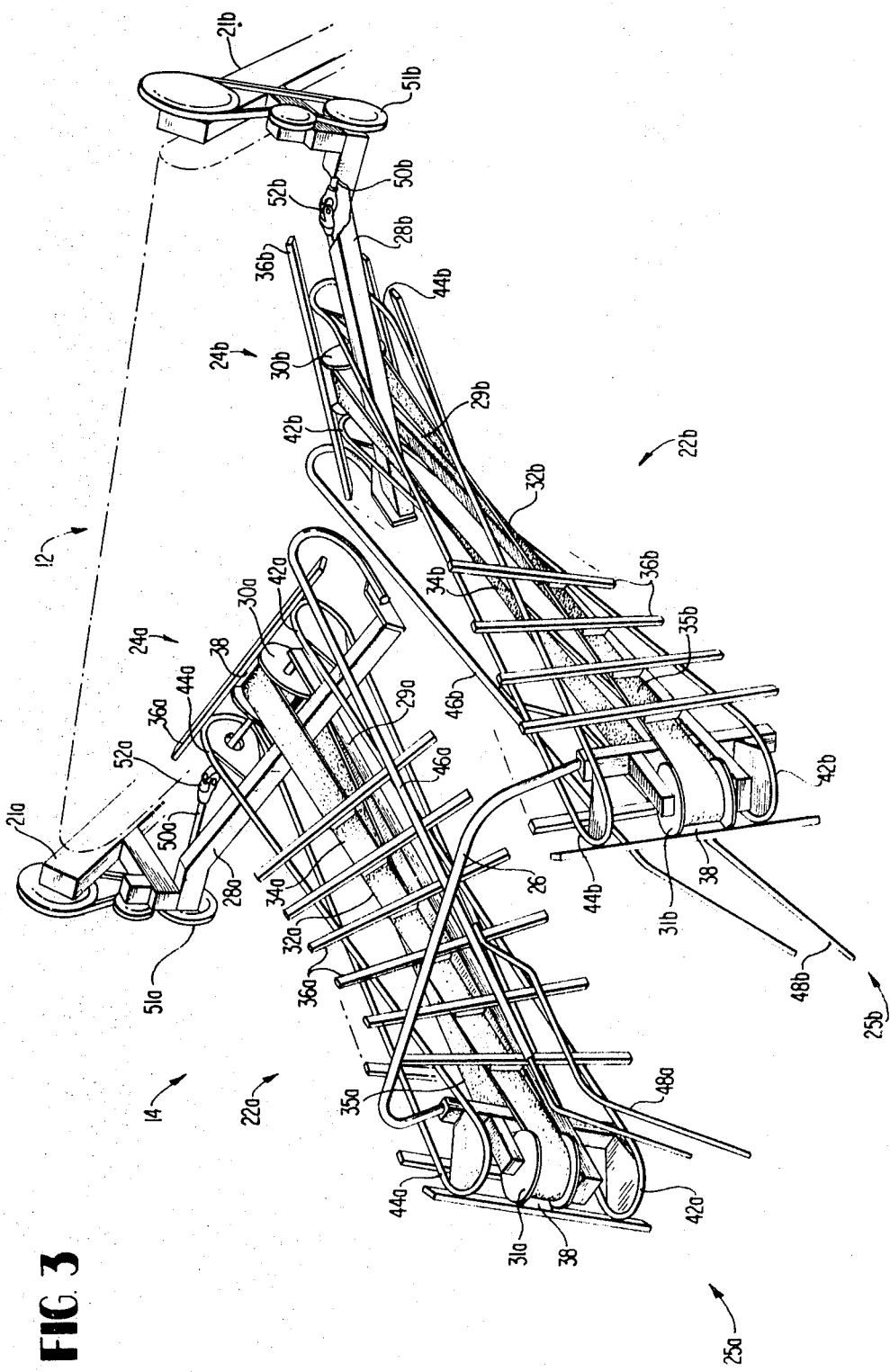
FIG. 3 is a perspective view of the inverter with parts broken away for clarity.

Referring now in more detail to the drawing, wherein like numerals indicate like parts throughout the several views, FIG. 1 shows digger-shaker-inverter 10 that includes a pair of plow assemblies 11a and 11b, shaker or conveyor means 12, and inverter 14. Shaker 12 is mounted on a framework and held in an inclined position, and the framework is supported by wheels 15. The plow assemblies 11a and 11b are also connected to the framework and are arranged to penetrate the surface of the ground ahead of the shaker to unearth the peanut plants. Inverter 14 is connected to the rear of shaker 12 and is arranged to receive the plants falling from the upper end of the shaker.

Plow assemblies 11a and 11b are spaced apart a distance which corresponds to the spacing of adjacent crop rows of peanut plants so that adjacent rows of plants can be unearthed simultaneously. Shaker 12 is wide enough to receive two rows of peanut plants simultaneously and move the plants generally in an upright attitude up the incline of the shaker and generally in two paths 16 a and 16 b. When the plants drop off the upper end 18 of the shaker, they are still generally upright and located in the separate paths 17a and 17b. In order to positively maintain the separate paths, a center coulter 19 and side coulters 20a and 20b are utilized to sever the foliage and roots of the vines from adjacent rows of vines.

As is illustrated in FIG. 3, inverter 14 is connected to the upper extensions 21a and 21b of the framework of shaker 12 and generally comprises a pair of inverting means or apparatus 22a and 22b which functions as propelling means to guide the peanut plants from infeed areas 24a and 24b to outfeed areas 25a and 25b. The pair of inverting means 22a and 22b are connected together at their outfeed areas by connecting yoke 26. Inclined support beams 28a and 28b are connected to the upper framework extensions 21a and 21b of the framework of the shaker and sloped downwardly and inwardly generally toward the centerline of the assembly. Rearwardly extending support beams 29a and 29b are connected at their forward ends to inclined support beams 28a and 28b and extend rearwardly of the assembly, generally on opposite sides of the centerline of the assembly.

Conveyor belt rollers 30a, 31a and 30b, 31b are connected to inclined support beams 28a and 28b and rearwardly extending support beams 29a and 29b respectively, and flexible endless conveyor belts 32a and 32b extend around the conveyor belt rollers. Conveyor belt rollers 30a and 30b are rotatable about axes generally parallel to inclined support beams 28a and 28b, respectively, so that the axes of rotation extend generally downwardly and inwardly toward the centerline of the assembly, while the axes of rotation of the conveyor belt rollers 31a and 31b are disposed 90° with respect to the axes of rotation of rollers 30a and 30b. This causes conveyor belts 32a and 32b to twist along their lengths, so that the upper flights 34a and 34b of the conveyor belts twist or roll about their axes of movement from conveyor belt rollers 30a and 30b toward rollers 31 a and 31b from an upwardly and inwardly sloped attitude, to an inwardly facing attitude, to a downwardly sloped attitude where they face the ground below the inverter 14. Of course, the return flights 35a and 35b are twisted in the opposite direction.

As is best illustrated in FIG. 5, a series of spaced slats 36a and 36b are connected to the conveyor belts 32a and 32b by means of guide blocks 38 and ribbed head elevator bolts 39. Conveyor belt rollers 30a, 30b, 31a and 31b all include outwardly sloped side flanges 40 and the edges 41 of the guide blocks 38 are sloped with a corresponding angle so as to abut the inside surfaces of the flanges 40. In this manner, guide blocks 38 will always pass between side flanges 40 of the conveyor belt rollers, and there will be virtually no hazard of the conveyor belts being dislodged from the surfaces of the rollers.

As is shown in FIGS. 3 and 5, a pair of endless guide rods 42a and 44a are positioned on opposite sides of conveyor belt 32a while a similar pair of guide rods 42b and 44b are positioned on opposite sides or the conveyor belt 32b. Guide rods 42a, 44a, 42b and 44b are twisted in a manner which corresponds to the twisting of the upper and lower flights 34a, 35a and 34b and 35b of the conveyor belts. The pairs of guide rods are spaced apart a distance less than the lengths of slats 36, and are constructed so that the slats 36 will normally bear upon and ride over the guide rods as they move with the conveyor belts. Thus, guide rods 42a, 44a and 42b, 44b positively guide slats 36 as they move with their respective conveyor belts 32a and 32b and function to form slat conveyor assemblies 45a and 45b which are spaced apart and extend rearwardly of shaker 12 and are positioned so as to receive and move the plants in individual paths 17a and 17b from the shaker toward the ground surface. In order to maintain the plants on the slat conveyor assemblies, a pair of plant guide tines 46 a and 46b are supported in cantilever fashion by inclined support beams 28a and 28b and extend along the inner edges of the conveyor assemblies and project rearwardly of the assembly. Branch tines 48 a and 48b extend rearwardly from tines 46a and 46 b respectively, and then turn in an inward direction.

In order to stabilize the two slat conveyor assemblies 45a and 45b, connecting yoke 26 is connected at its ends to the rearward ends of rearwardly extending support beams 29a and 29b. The base leg of connecting yoke 26 is spaced upwardly from the slat conveyor assemblies so as to not interfere with the movement of the plants on the conveyor assemblies, while the downwardly extending legs of the yoke project into the spaces between the conveyor flights.

Conveyor belt rollers 30a and 30b are powered from drive shafts 50a and 50 b which are connected to belt-driven sheaves 51a and 51b, and the belt-driven sheaves are connected to the upper driven shaft of the shaker. Universal joints 52a and 52b change the horizontal rotational movement from sheaves 51a and 51b to inclined rotary movement.

OPERATION

As is schematically illustrated in FIG. 6, the digger-shaker-inverter functions to unearth the peanut plants from adjacent crop rows and maintain the plants in identifiable paths, rows or ribbons 55a and 55b and elevate the plants up the incline of the shaker in separate paths 16a and 16b. The dirt clinging to the roots and peanuts of the vines is vibrated and removed from the plants as they move up the incline and the dirt is allowed to fall back to the ground beneath the shaker. The plants 56 are maintained approximately in upright attitudes as they are unearthed and move up the incline of the shaker. When the plants move over the upper end of the shaker, they will again tend to fall onto the inverter 14 in an upright attitude with the foliage 58 generally above the nuts 59. The inverter 14 propels the plants away from shaker 12. As the plants move through their paths 17a and 17b on the inverter, they are rolled or twisted along their direction of movement so that the foliage 58 tends to roll inwardly and downwardly between the paths 17a and 17b while the peanuts tend to roll or twist outwardly and upwardly around the paths. When the plants are dropped into the infeed areas 24a and 24b of the inverter, they fall onto the inwardly sloped incline of the slat conveyor assemblies 45a and 45b and then are tilted further and further inwardly and finally virtually inverted as the slat conveyor assemblies move the plants through paths 17a and 17b. By the time the plants reach the outfeed areas 25a and 25b the foliage is disposed generally below the peanuts and the twisting motion of the plants continues after the plants drop off the ends of the slat conveyor assemblies so that the plants are completely inverted by the time they reach the ground.

Plant guide tines 46a and 46b function to keep the plants from falling off the slat conveyor assemblies until the plants reach the ends of the conveyor assemblies. When the plants initially drop onto the slats, they will rest primarily on the slats. As the plants move with the conveyor assemblies, they lean more and more into the plant guide tines. As the plants approach the end of the conveyor assemblies, auxiliary tines 48a and 48b function to provide additional support to the foliage to prevent the plants from dropping between the conveyor assemblies before reaching the ends of paths 17a and 17b. Generally speaking, the paths 17a and 17b are somewhat helical and coverage at outfeed areas 25a and 25b in order to form a single row of plants when the plants are dropped upon the ground. The plants tend to curl about the plant guide tines 46a and 46b until the foliage of the plants is oriented in a downward attitude.

While this invention has been described in detail with particular reference to preferred embodiments thereof, it will be understood that variations and modifications can be effected within the spirit and scope of the invention as described hereinbefore and as defined in the appended claims.

We claim:

1. Apparatus for harvesting peanuts or the like comprising a shaker including inclined conveyor means for retrieving and elevating peanut-laden plants, an inverter mechanism connected to said shaker and comprising a pair of slat conveyor means positioned behind and below the upper end of said shaker and on opposite sides of the centerline of said shaker and each having an upper flight movable away from said shaker and twisted along its length inwardly toward the centerline of said shaker for receiving peanut-laden plants dropped from the upper end of said shaker and inverting the plants as the plants move from said shaker over said slat conveyor means to the ground.

2. The apparatus of claim 1 and wherein the upper flights of said slat conveyor means are inclined across their length downwardly from the horizontal and inwardly toward the centerline of said apparatus at a position adjacent said shaker and are twisted further inwardly into facing relationship along their lengths extending away from said shaker.

3. An apparatus for harvesting peanut plants or the like including plow means movable through the ground to unearth peanut plants and an inclined conveyor movable with said plow means for retrieving the plants from the ground and elevating and shaking the plants, the improvement therein of inverting apparatus movable with said conveyor for receiving the plants from the upper end of said conveyor and comprising an infeed area behind and spaced below the upper end of said conveyor to receive the plants dropped over the upper end of the conveyor and an outfeed area spaced rearwardly of said infeed area, said inverting apparatus including means for propelling the plants in a rearward direction from said infeed area toward said outfeed area and progressively inverting the plants as they move from said infeed area toward said outfeed area.

4. The apparatus of claim 3 and wherein said means for propelling the plants comprises at least one plant guide tine extending from said infeed area toward said outfeed area, and means movable along the length of said tine to urge the plants to follow said tine from said infeed area to the outfeed area.

5. The apparatus of claim 3 and wherein said means for propelling the plants is constructed and arranged to generally twist the plants about their axes of movement from said infeed area toward said outfeed area.

6. Apparatus for harvesting peanuts or the like comprising: an inclined conveyor means movable along a row of plants for elevating the plants and shaking dirt from the plants, and inverting means positioned behind and below the upper end of said conveyor means for receiving the plants dropped from the upper end of said conveyor means and moving the plants generally away from said conveyor means and twisting the plants generally about their direction of movement so as to deposit the plants on the ground in an inverted position.

7. The apparatus of claim 6 and wherein said inverting means comprises a pair of spaced-apart belt-type conveyors with upper flights movable away from said conveyor means, said conveyor belts having their upper flights twisted along their lengths extending away from said conveyor means from a downwardly and inwardly inclined attitude to a facing attitude.

8. The apparatus of claim 6 and wherein said inverting means includes a plurality of plant guide tines having free ends extending away from said conveyor means for guiding the plants.

9. Apparatus for harvesting peanuts or the like comprising:
an inclined conveyor means movable along two generally parallel adjacent rows of plants for elevating the plants and shaking the dirt from the plants, and
inverting means positioned behind and below the upper end of said conveyor means for receiving the plants dropped from the upper end of said conveyor means in generally separate paths from the conveyor means, said inverting means including guide means for moving the plants away from said conveyor means in generally separate paths and rolling the foliage of the plants from generally above the plants down generally between the paths of the plants to invert the plants so that the plants are deposited on the ground in a generally roots-up attitude.

10. A method of harvesting peanuts or the like comprising:
unearthing the plants from adjacent rows of plants,
elevating and shaking the plants of adjacent rows while maintaining the plants in generally separate paths,
dropping the plants to a lower generally relatively rearwardly moving open surface,
simultaneously urging the plants rearwardly along the surface and rolling the plants so that the foliage of the plants generally passes between the paths,
and depositing the plants generally in a single row on the ground in an inverted attitude.

11. The method of claim 10 and wherein the step of dropping the plants to a lower surface comprises dropping the plants of each path onto an inwardly sloped surface to tilt the plants of each path toward the opposite path as the plants are received on the sloped surfaces.

12. The apparatus of claim 9 and wherein said inverting means comprises generally open surfaces on opposite sides of the centerline of said inverter sloped inwardly toward the centerline of said inverter adjacent said conveyor means, said generally open surfaces being twisted along their lengths away from said conveyor means toward a generally facing attitude.

Disclaimer 3,613,797.—*Carroll J. Whitfield* and *Jack C. Whitesides*, Columbus, Ga. PEANUT DIGGER, SHAKER AND INVERTER. Patent dated Oct. 19, 1971. Disclaimer filed Dec. 5, 1980, by the assignee, *Kelley Manufacturing Co.*

Hereby enters this disclaimer to claims 3, 4, 5, 6, 8, 9 and 10 of said patent.

[*Official Gazette October 11, 1983.*]